(12) United States Patent
Karlberg (10) Patent No.: US 7,689,664 B2
(45) Date of Patent: Mar. 30, 2010

(54) SYSTEM AND METHOD FOR INSTALLING AND CONFIGURING SOFTWARE APPLICATIONS ON A MOBILE NETWORKED TERMINAL

(75) Inventor: Johan Karlberg, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 842 days.

(21) Appl. No.: 11/463,619

(22) Filed: Aug. 10, 2006

(65) Prior Publication Data

US 2008/0040490 A1   Feb. 14, 2008

(51) Int. Cl.
G06F 15/16 (2006.01)
(52) U.S. Cl. .................. 709/217; 709/203; 709/219; 709/223; 709/224; 717/168; 717/174
(58) Field of Classification Search .................. 709/203, 709/217, 219, 223, 224; 717/168, 174
See application file for complete search history.

(56) References Cited

U.S. PATENT DOCUMENTS

| 6,094,679 | A | 7/2000 | Teng et al. |
| 6,453,413 | B1 | 9/2002 | Chen et al. |
| 7,024,470 | B2 | 4/2006 | Bellinger et al. |
| 7,054,924 | B1 | 5/2006 | Harvey et al. |
| 2004/0034853 | A1* | 2/2004 | Gibbons et al. ............. 717/174 |
| 2005/0245249 | A1 | 11/2005 | Wierman et al. |

OTHER PUBLICATIONS

International Search Report for corresponding Application No. PCT/IB2007/000202 mailed Jul. 12, 2007.
International Preliminary Report on Patentability for corresponding International Application No. PCT/IB2007/000202, dated Dec. 3, 2008.

* cited by examiner

*Primary Examiner*—Shawki S Ismail
(74) *Attorney, Agent, or Firm*—Renner, Otto, Boisselle & Sklar, LLP (57) ABSTRACT

An application download server comprises a download request object and a configuration parameter object. The download request object receives a download request from a remote terminal. The download request identifies a requested application for download to the remote terminal. The configuration parameter object returns a configured application package to the remote terminal. The configured application package comprises installation files corresponding to the requested application and configuration files. The configuration files comprise a parameter value for each of a plurality of configuration parameters needed for operation of the requested application on the remote terminal.

18 Claims, 3 Drawing Sheets

SYSTEM AND METHOD FOR INSTALLING AND CONFIGURING SOFTWARE APPLICATIONS ON A MOBILE NETWORKED TERMINAL

TECHNICAL FIELD OF THE INVENTION

The present invention relates to mobile electronic devices and in particular to systems and methods for installing and configuring software applications for download to and operation on a mobile networked terminal.

DESCRIPTION OF THE RELATED ART

A software application is typically installed on a computer system by either downloading installation files for the software from a remote server or reading the installation files from a CD ROM or other media.

During execution of the installation files, the computer system may: i) detect certain hardware parameters and automatically select configuration parameter values needed for execution of the application on the detected hardware; and ii) prompt the user to manually enter configuration parameter values which may include both user selectable configuration parameter values and user entry of configuration parameter values which may be associated with a service provider with which the application operates. For example, installation of an email client may require entry of service provider configuration parameter values such as the URL of the incoming and outgoing email servers.

This installation process is relatively efficient when performed on a desk top computer or a note book computer for at least two reasons. First, obtaining the installation files using a desk top computer or notebook computer is relative easy. The full QWERTY keyboard and full size display screen make navigating web links to locate a web page that permits download of the desired application from a server quite easy. Further, most desk top computers and notebook computers are easily coupled to a peripheral devices such as disk drives, CD drives, and DVD drives for copying of installation files from applicable storage media.

Second, manual entry of configuration parameter values is relatively easy when performed on a user interface that includes a full QWERTY keyboard and a large display screen of a desk top computer or a notebook computer. The large display screen provides plenty of space for the display of easy to read instructions for entry of configuration parameter values and the keyboard provides for easy entry.

In a separate field of art, mobile networked radio terminals, such as mobile telephones, have evolved into sophisticated computerize/communication equipment capable of running application software such as address books, email clients, web browsers, and etc.

To enable installation of software on mobile network terminals, suppliers have provided systems for connecting the mobile network terminal to a desktop or notebook computer using a point-to-point link such as a wired serial connection, an infrared serial connection, or a blue tooth serial connection.

More specifically, a communication/management application is installed on the desktop or notebook computer (using the processes described above) which enables use of the computer's QWERTY keyboard and display for management of the mobile network terminal and management of the transfer of data between the computer and the mobile network terminal through the connection.

The desktop computer or notebook computer may be used to locate a source of installation files for the software application either by browsing the web for a web page that provides for download of the installation files or copying the installation files from a storage media.

The communication/management application in conjunction with the installation files provide for use of the display screen and QWERTY keyboard of the desktop computer for manual entry of configuration parameters and installation of the application and configuration files on the mobile network terminal through the connection between the computer and the mobile network terminal.

This process of connecting a mobile network terminal to a desktop or notebook computer, installation of a communication/management application on the desktop or notebook computer, downloading or copying installation files for an application by the desktop or notebook computer, manual entry of configuration parameter values, and installation of the application on the mobile network terminal is cumbersome at best.

Further, a user installing an application may not have needed configuration parameter value readily available. As such, the user may need to locate and retrieve needed configuration parameter values from multiple papers and/or multiple electronic files (e.g e-mails, web pages)—or even need to contact support representatives of a service provider to obtain needed configuration parameter values.

What is needed is a system and method that provides for more convenient loading of applications onto a mobile network terminal and, more specifically, a system and method for more convenient loading and configuration of applications for operation on a mobile network terminal.

SUMMARY

A first aspect of the present invention comprises an application download server for providing a configured application package to a remote terminal. The application download server comprises a download request object and a configuration parameter object.

The download request object receives a download request from a remote terminal. The download request identifies a requested application for download to the remote terminal.

The configuration parameter object returns a configured application package to the remote terminal. The configured application package comprises installation files corresponding to the requested application and configuration files. The configuration files comprise a parameter value for each of a plurality of configuration parameters needed for operation of the requested application on the remote terminal.

The configuration parameter object returns a configured application package by: i) identifying, for the requested application, a plurality of configuration parameters needed for operation of the requested application on the remote terminal; ii) identifying, for each of the plurality of configuration parameters, a source of a parameter value; iii) obtaining, for each of the plurality of configuration parameters, a parameter value from its identified source; iv) building the configured application package; and v) providing the configured application package to the remote terminal.

The configuration parameter object may maintain a database which associates, for each of a plurality of applications, identification of the plurality of configuration parameters needed for operation of the application on the remote terminal. The database may further associate, for each configuration parameter, identification of a source of a parameter value.

In one sub embodiment, the configuration parameter object may: i) identify at least two configuration parameters needed for operation of the requested application on the remote terminal; ii) identify a first source associated with a first of the at least two configuration parameters; iii) identify a second source associated with a second of the at least two configuration parameters, iv) obtain a first parameter value for the first configuration parameter from the first source; and v) obtain a second parameter value for the second configuration parameter from the second source.

The first source and the second source are independent sources. The configuration files include at least the first parameter value and the second parameter value. Further, the configuration parameters may include at least two of the following configuration parameters: i) a service account parameter, ii) an application server parameter; and iii) a remote terminal compatibility parameter. The service account parameter is a configuration parameter unique to a service account associated with the remote terminal. The application server parameter is unique to an application server with which the application, when operated on the remote terminal, will interact and is a common value for a plurality of remote terminals which interact with the application server. The remote terminal compatibility parameter is associated with a characteristic of the remote terminal which effects operation of the requested application.

Further yet, a specific version of installation files may be selected from a plurality of versions of installation files corresponding to the requested application. The specific version of installation files is a version which corresponds to a compatibility parameter value associated with the remote terminal.

A second aspect of the present invention is to provide a method of operating an application download server to provide an installable application to a remote terminal. The method comprises receiving a download request from the remote terminal and returning a configured application package to the remote terminal.

The download request identifies a requested application for download to the remote terminal. The configured application package comprises installation files corresponding to the requested application and configuration files. The configuration files comprise a parameter value for each of a plurality of configuration parameters needed for operation of the requested application on the remote terminal.

In one embodiment, the configured application package may be returned by performing the following steps: i) identifying, for the requested application, a plurality of configuration parameters needed for operation of the requested application on the remote terminal; ii) identifying, for each of the plurality of configuration parameters, a source of a parameter value; iii) obtaining, for each of the plurality of configuration parameters, a parameter value from its identified source; iv) building the configured application package; and v) providing the configured application package to the remote terminal.

Further, identifying a plurality of configuration parameters needed for operation of the requested application on the remote terminal may comprise looking up such plurality of configuration parameters in a database that associates, for each of a plurality of applications, identification of the plurality of configuration parameters needed for operation of the application on the remote terminal.

Further, identifying, for each of the plurality of configuration parameters, a source of a parameter value comprises looking up a source of each parameter value in a database which associates, for each configuration parameter, identification of a source of the parameter value.

Further yet, identifying a plurality of configuration parameters needed for operation of the requested application on the remote terminal may comprise: i) identifying at least two configuration parameters needed for operation of the requested application on the remote terminal; ii) identifying a first source associated with a first of the at least two configuration parameters; iii) identifying a second source associated with a second of the at least two configuration parameters; iv) obtaining, for each of the plurality of configuration parameters, a parameter value from its identified source—which comprises obtaining a first parameter value for the first configuration parameter from the first source and obtaining a second parameter value for the second configuration parameter from the second source.

The first source and the second source may be independent sources. The configuration files includes at least the first parameter value and the second parameter value. Further, the configuration parameters may include at least two of the following configuration parameters: i) a service account parameter, ii) an application server parameter; and iii) a remote terminal compatibility parameter. The service account parameter is a configuration parameter unique to a service account associated with the remote terminal. The application server parameter is unique to an application server with which the application, when operated on the remote terminal, will interact and is a common value for a plurality of remote terminals which interact with the application server. The remote terminal compatibility parameter is associated with a characteristic of the remote terminal which effects operation of the requested application.

The method may further include providing a specific version of installation files with the specific version being selected from a plurality of versions of installation files corresponding to the requested application. The specific version of installation files may be a version which corresponds to a compatibility parameter value associated with the remote terminal.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

The term "electronic equipment" as referred to herein includes portable radio communication equipment. The term "portable radio communication equipment", also referred to herein as a "mobile radio terminal" or a "mobile networked terminal" includes all equipment such as mobile phones, pagers, communicators, e.g., electronic organizers, personal digital assistants (PDAs), smart phones or similar equipment which includes radio communication systems for communication within a service provider's network infrastructure.

It should also be appreciated that many of the elements discussed in this specification, whether referred to as a "system" a "module" a "circuit" or similar, may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

Figure 1:
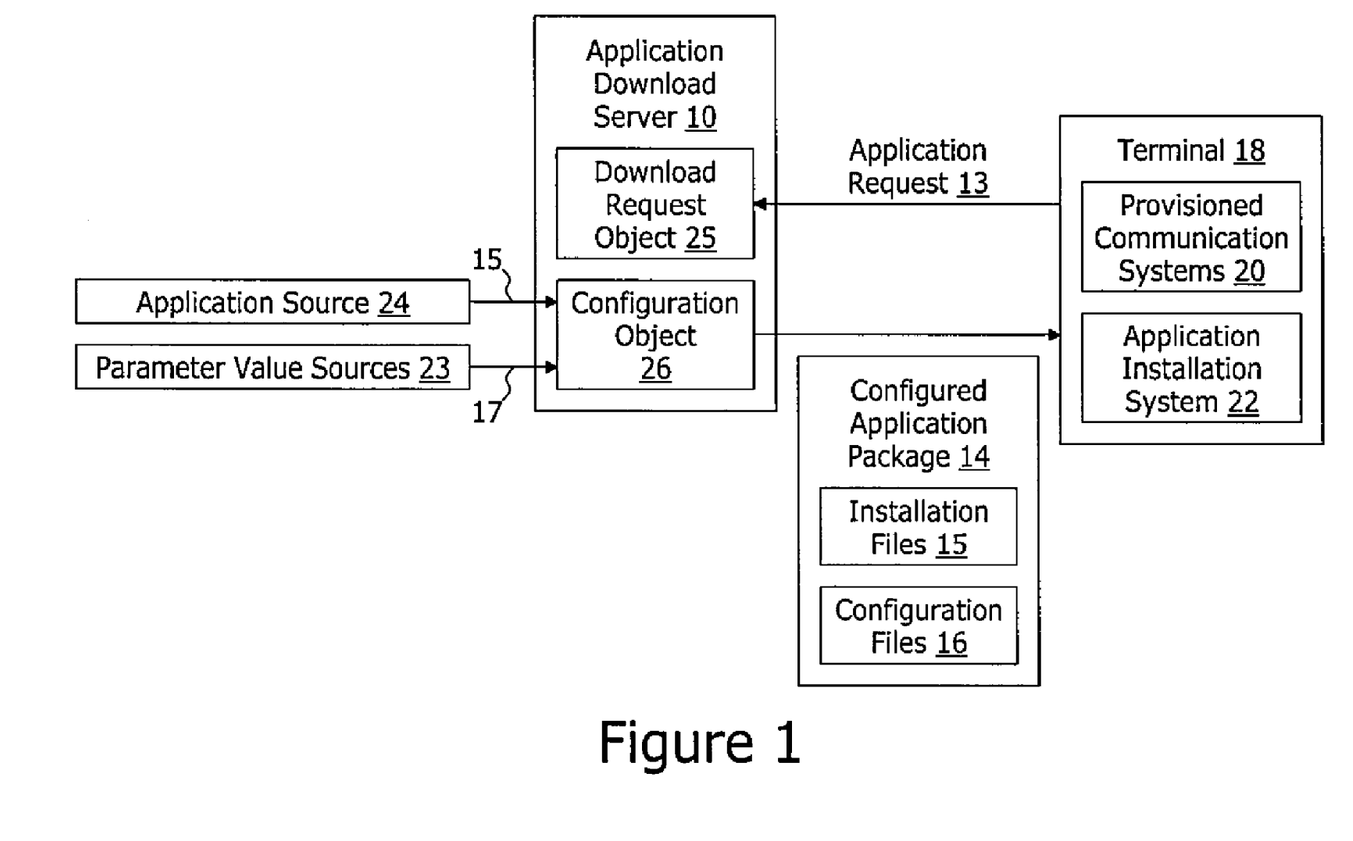
FIG. 1 is a block diagram representing an overview of an exemplary embodiment of the present invention.

With reference to FIG. 1, the present invention comprises an application download server 10 for providing a configured application package 14 to a mobile networked terminal 18.

In more detail, the terminal 18 includes a provisioned communication system 20 which enables the terminal 18 to communicate within a service provider's network infrastructure and an application installation system 22. The application installation system 22: i) enables the terminal 18 to generate an application request 13 to the application download server 10 and obtain a configured application package 14 in response thereto. Communication with the application download server 10 is through the service provider's network infrastructure.

The application request 13 identifies a software application to be installed on the terminal 18. The configured application package 14 includes installation files 15 for the requested software application and configuration files 16 which include configuration parameter values for driving operation of the software application on the terminal 18. The installation files 16 and the configuration files 16 may be separate distinct files. Alternatively, the installation files 15 and the configuration files 16 may be combined in or with common files without departing from the scope of the invention.

Upon receipt of the configured application package 14, the application installation system 22 may execute the installation files 15 included in the configured application package 14 to install a software application for operation on the terminal 18, and load the configuration files 16 on terminal 18 to drive operation of the software application.

In an exemplary embodiment, the application download server 10 may comprise a download request object 25 and a configuration parameter object 26. The download request object 25 receives the application request 13 from the terminal 18.

The configuration parameter object 26 obtains the installation files 15 for the requested application from an application source 24, looks up configuration parameters needed for operation of the requested application, obtains parameter values 17 for each of the needed configuration parameters from parameter sources 23, and builds the configured application package 14 for delivery to the terminal 18.

It should be appreciated that the division of functions between the exemplary download request object 25 and the exemplary configuration parameter object 26 described herein is for purposes of illustration and clarity. Those skilled in the art will recognize that the functions discussed with respect to each of the download request object 25 and the configuration parameter object 26 may readily be performed by other permutations of one or more executable software objects.

Figure 2:
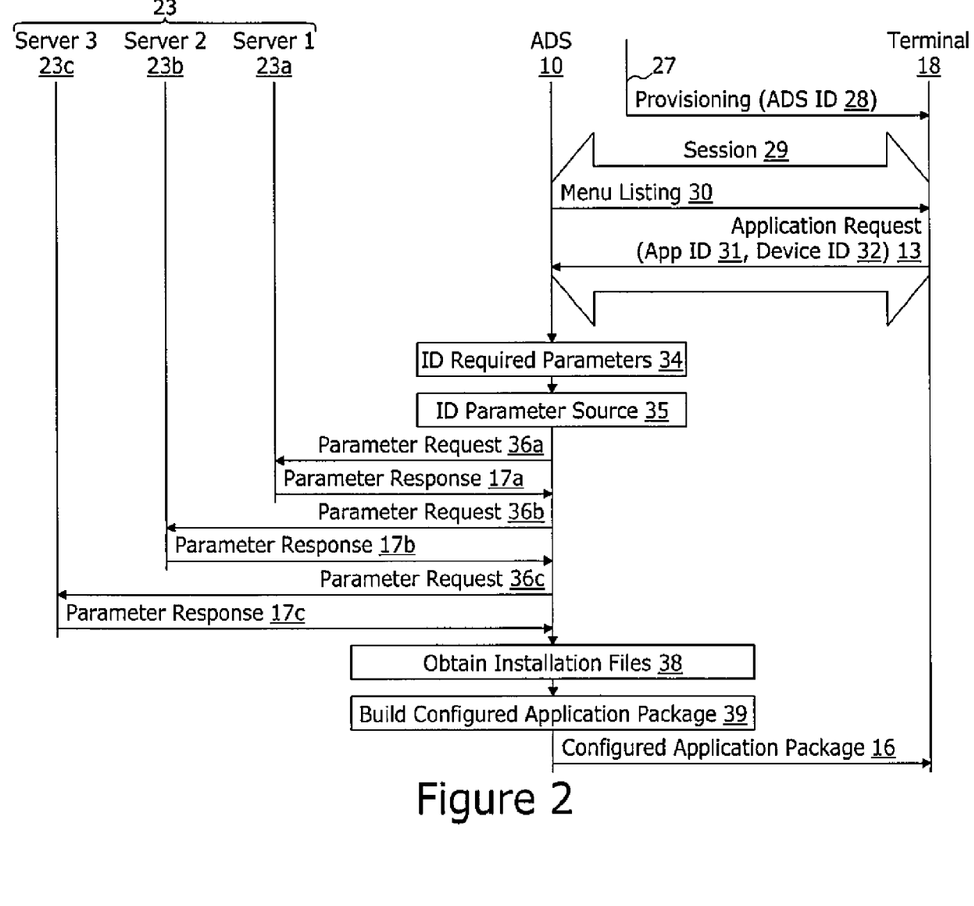
FIG. 2 is a flow chart representing an overview of operation of an exemplary embodiment of the present invention.

FIG. 2 is a flow chart representing a more detailed depiction of an exemplary embodiment of the present invention. Referring to the flow chart of FIG. 2 in conjunction with FIG. 1, the mobile network terminal 18 is provisioned 27 for operation within a service provider's network systems in a typical manner.

Such provisioning 27 may be by a combination of installing pre-set provisioning parameter values at the time the network terminal 18 is manufactured and/or manually entering provisioning parameter values at the time of delivery of the terminal 18 to the customer or at such other time as the terminal 18 is associated with a customer service account.

It is also envisioned that provisioning 27 of the mobile network terminal 18 may be by automated means wherein provisioning systems and/or servers make provisioning parameter values available to the mobile network terminal 19 (and particularly to the communication systems 20 of the mobile network terminal 18) on an automated basis.

It should be appreciated that one provisioning parameter values provided during provisioning 19 may be identification of an application download server 10 (ADS ID 28) serving the mobile network terminal 18. Identification may be by URL, network address, or other identifying means which enables the terminal 18 to establish a communication session with the application download server 10 via the service provider's network infrastructure.

The application download server 10 makes a plurality of applications available for download by remote terminals 18. In one sub embodiment, the terminal 18 may initiate a session 29 (such as a TCP/IP session) with the application download server 10 (or more specifically with the download request object 25 of the application download server 10).

A menu listing 30 of available applications may be provided to the terminal 18 and the terminal 18 may generate the application request 13 by selecting an application identifier 31 from the menu listing 30 or by otherwise including an application identifier 31 in the application request 13.

In another sub embodiment, the terminal 18 may generate the application request 13 independent of obtaining a menu listing 30 by including an application identifier 31 in the application request 13.

In either embodiment, a device identifier 32 which identifies one or more of the remote terminal 18, a user of the remote terminal 18, or a service provider account associated with the remote terminal 18 is provided to the application download server 10 by either part of the session 29 or by inclusion in the in the application request 13.

Step 34 represents the application download server 10 (more specifically, the configuration object 26 of the application download server 10) identifying the configuration parameters that are required for operation of the requested application on the terminal 18. The required configuration parameters may include a combination of: i) device compatibility parameters which are parameters related to the hardware and operating systems of the terminal 18 and may require configuration with values applicable to the hardware and operating systems of the terminal 18 for the requested application to properly execute on the terminal; ii) application server parameters which are parameters with values applicable to the servers which the requested application will interact—and are common values for a plurality of devices which obtain services from such servers; and iii) service account parameters which are parameters unique to the terminal 18, the user of the terminal 18, or the service account associated with the terminal 18 or the user of the terminal 18.

Exemplary device compatibility parameters may include: i) parameters identifying a format or resolution of the display screen of the terminal 18; ii) parameters identifying a configuration of the keyboard of the terminal 18; iii) parameters identifying a size and configuration of memory of the terminal 18; and/or iv) parameters identifying a identification of an operating system executing on terminal 18.

Exemplary application server parameters for an email client application include: i) parameters identifying a URL of a POP3 server; ii) parameters identifying a URL of an SMTP server; and iii) parameters identifying port and authentication requirements for connecting to each of the POP2 server and the SMTP server.

Exemplary account parameter for an email client application include: i) parameters identifying a user name; ii) parameters identifying a password; and iii) parameters identifying a return email address.

It should be appreciated that values for each of device compatibility parameters, application server parameters, and account parameters are controlled by and/or derived from information related to the model and physical characteristics of the terminal 18, the service account associated with the terminal 18, and the servers of the service provider's network infrastructure. As such, the values for these compatibility parameters may be obtained from such network infrastructure parameter value sources 23 rather being manually input to the time of installation of the application on the terminal 18.

Figure 3:
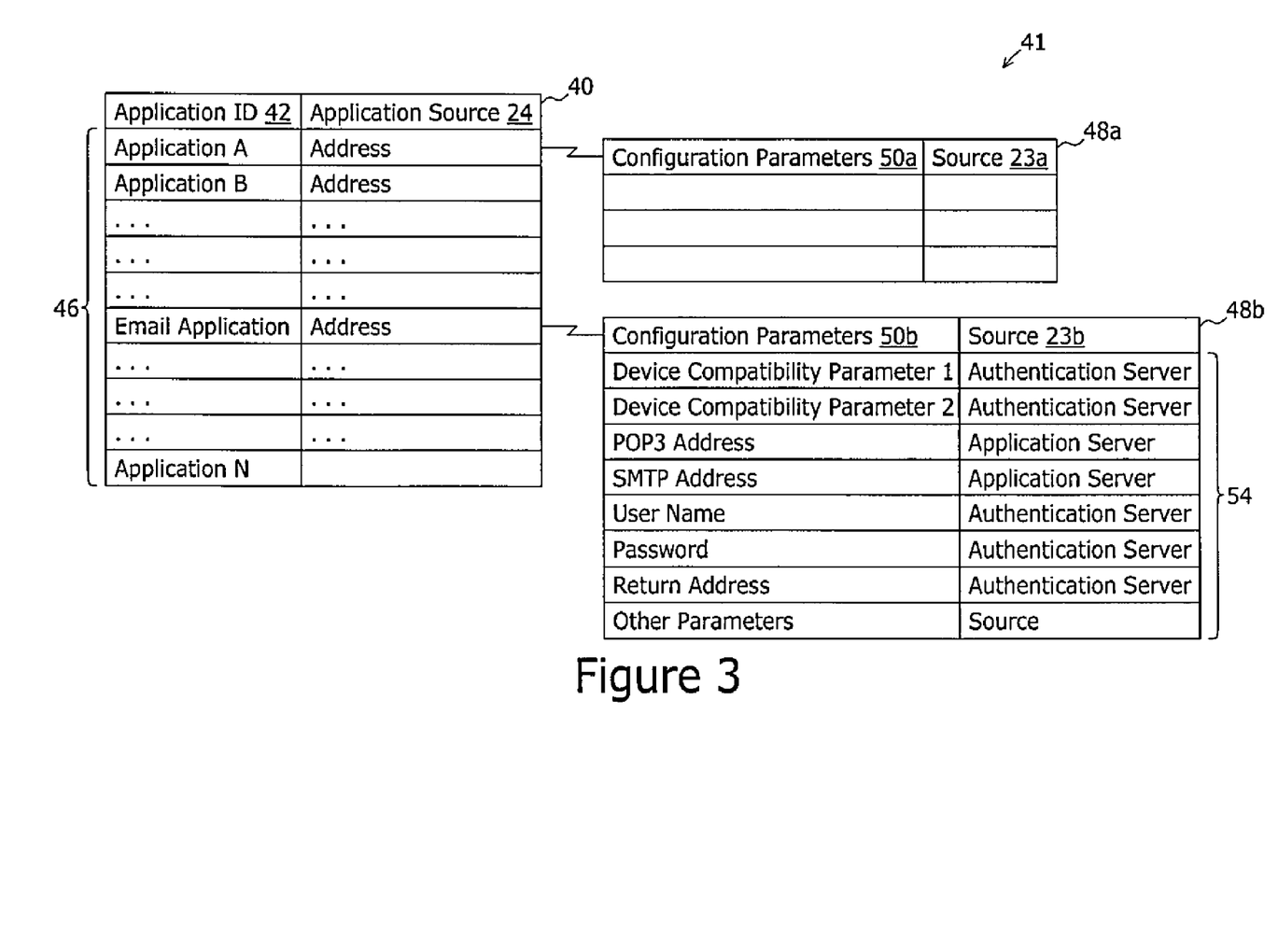
FIG. 3 is a block diagram representing table structure of a database useful in implementing an exemplary embodiment of the present invention.

Turning briefly to FIG. 3 in conjunction with FIG. 2, the application download server 10 may identify the configuration parameters that are required for operation of the requested application on the terminal 18 by reference to a look up database 41. The look up database 418 may include an application table 40 with a plurality of records 46. Each record 46 associates an application (identified by an application identifier 42) with an identifier of the application source 24 where the application installation files 15 may be obtained. The application source 44 may be a location of the application installation files on storage media and or an identifier for a remote server that can provide the application installation files 15.

Also associated with each application identifier 42 is a table that identifies the configuration parameters 50 that are required for installation of the application on a terminal 18. For example, an email client application may require configuration of installation parameters such as: i) certain device compatibility parameters; ii) URL of a POP3 server; iii) URL of an SMTP server; iv) user name; v) password; vi) return address; vi) other parameters. In the exemplary table structure, each configuration parameter 50 is stored in a record 54 which associates the configuration parameter 50 with an identifier of the parameter value source 23.

Exemplary parameter value sources 23 include local and remote systems to which processing calls may be made using internal processing call systems, web services systems (e.g. SOAP messaging), or other messaging protocols.

For example, with reference again to FIG. 2, the device compatibility parameters (such as display size/resolution, memory size, operating system etc) may be obtained by making a processing call (step 36a) to a first system. Such first system is represented by server 23a (which may be an authentication server which stores an indication of the model of the terminal 18 in association with an identification number of terminal 18). However it should be appreciated that, in the alternative, such first system could readily be an internal process operated by the application download server 10. Such first system may derive the parameter values from the device ID 28 and return the parameter values to the application download server 10 as represented by step 17a. The device ID 28 may explicitly (model identification included in the device ID) or implicitly (device ID used to look up model) identifies the model of the terminal 18.

The application server parameters (such as a URL for a POP3 server and a URL for a SMTP server) may be obtained by making a processing call (step 36b) to a second system. Such second system is represented by server 23b which may be a server which provides application related services such as a POP3 server, an SMTP server, or a directory server which identifies the POP3 server or SMTP server. Such second system may return the parameter values to the application download server 10 as represented by step 17b. Again it should be appreciated that, in the alternative, such second system could readily be an internal process operated by the application download server 10.

The account parameters (such as account number, password, and return email address) may be obtained by making a processing call (step 36c) to a third system. Such third system is represented by server 23c which may be a server which maintains and provides account information such as account number, password, and return email address associated with the terminal 18, the user of the terminal 18, and/or a service account associated with the terminal 18 and/or the user of the terminal 18. Such third system may return the parameter values to the application download server 10 as represented by step 17c. Yet again it should be appreciated that, in the alternative, such third system could readily be an internal process operated by the application download server 10.

Step 38 represents the application download server 10 obtaining the requested application installation files 15 from the application source 24. The application source 24 may be any of local storage media and/or storage media associated with a remote server. Obtaining the application installation files 15 from a remote server and/or storage media may be performed before receipt of the application request 13 such that the application installation files are obtained from local storage after the application request 13.

Further, because a plurality of different models of remote terminals 18 may generate application requests to the application download server 10, step 38 may include identifying specific installation files. More specifically, step 38 may include obtaining, from the application source 24, a specific version of installation files selected from a plurality of versions of installation files for the requested application. The specific version of installation files is a version which corresponds to a compatibility value associated with the remote terminal 18.

Step 39 represents building a configured application package 14 for delivery to the terminal 18. The configured application package 14 includes the application installation files 15 and configuration files 16 which includes the parameter values 17 provided by the three sources 23a, 23b, and 23c (e.g. device compatibility parameters, application server parameters, and account parameters). The configured application package 14 is then delivered to the terminal 18 for installation of the application by the application installation system 22 as discussed above.

It should be appreciated that structure and functions described herein provide for a convenient system and method for installing and configuring an application on a mobile networked terminal without requiring use of an interface/communication program on a desktop or notebook computer and without requiring manual entry of configuration parameters through a limited user interface of the mobile networked terminal.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. An application download system comprising:
a network server, and a computer program executed by the server, the computer program when executed comprising:
 a download request object receiving a download request from a remote terminal via a network, the download request including identification of a requested application for download to the remote terminal; and
 a configuration parameter object:
  identifying, for the requested application, a plurality of configuration parameters needed for operation of the requested application on the remote terminal;
  identifying, for each of the plurality of configuration parameters, a source of a parameter value;
  obtaining, for each of the plurality of configuration parameters, a parameter value from its identified source;
  building the configured application package; and
  returning a configured application package to the remote terminal, the configured application package comprising installation files corresponding to the requested application and configuration files; and
 the configuration files comprising the parameter value for each of a plurality of configuration parameters needed for operation of the requested application on the remote terminal.

2. The application download system of claim 1, wherein the configuration parameter object maintains a database associating:
for each of a plurality of applications, identification of the plurality of configuration parameters needed for operation of the application on the remote terminal; and
for each configuration parameter, identification of a source of a parameter value.

3. The application download system of claim 2, wherein: the configuration parameter object:
identifies at least two configuration parameters needed for operation of the requested application on the remote terminal;
identifying a first source associated with a first of the at least two configuration parameters;
identifying second source associated with a second of the at least two configuration parameters, the first source and the second source being independent sources;
obtaining a first parameter value for the first configuration parameter from the first source; and
obtaining a second parameter value for the second configuration parameter from the second source; and
the configuration files include at least the first parameter value and the second parameter value.

4. The application download system of claim 3, wherein the configuration parameters include at least two of the following configuration parameters:
a service account parameter, the service account parameter being a configuration parameter unique to a service account associated with the remote terminal;
an application server parameter, the application server parameter being unique to an application server with which the application, when operated on the remote terminal, will interact and common to a plurality of remote terminals which interact with the application server; and
a remote terminal compatibility parameter, the remote terminal compatibility parameter associating with a characteristic of the remote terminal which effects operation of the requested application.

5. The application download system of claim 4, wherein a specific version of installation files is selected from a plurality of versions of installation files corresponding to the requested application, the specific version of installation files being a version which corresponds to a compatibility parameter value associated with the remote terminal.

6. The application download system of claim 1, wherein:
the download request further includes identification of the remote terminal; and
a specific version of installation files is selected from a plurality of versions of installation files corresponding to the requested application, the specific version of installation files being a version which corresponds to a compatibility parameter value associated with the remote terminal, the compatibly parameter value being derived form the identification of the remote terminal.

7. The application download system of claim 6, wherein the configuration parameter object maintains a database associating:
for each of a plurality of applications, identification of configuration parameters needed for operation of the application on the remote terminal; and
for each configuration parameter, identification of a source of a parameter value.

8. The application download system of claim 7, wherein: the configuration parameter object:
identifies at least two configuration parameters needed for operation of the requested application on the remote terminal;
identifying a first source associated with a first of the at least two configuration parameters;
identifying second source associated with a second of the at least two configuration parameters, the first source and the second source being independent sources;
obtaining a first parameter value for the first configuration parameter form the first source; and
obtaining a second parameter value for the second configuration parameter form the second source; and
the configuration files include at least the first parameter value and the second parameter value.

9. The application download system of claim 8, wherein the configuration parameters include at least two of the following configuration parameters:
a service account parameter, the service account parameter being a configuration parameter unique to a service account associated with the remote terminal;
an application server parameter, the application server parameter being unique to an application server with which the application, when operated on the remote terminal, will interact and common to a plurality of remote terminals which interact with the application server; and a remote terminal compatibility parameter, the remote terminal compatibility parameter associating with a characteristic of the remote terminal which effects operation of the requested application.

10. A method of operating an application download server to provide an installable application to a remote terminal, the method comprising:

receiving a download request from the remote terminal via a network connection, the download request identifying a requested application for download to the remote terminal; and identifying, for the requested application, a plurality of configuration parameters needed for operation of the requested application on the remote terminal;

identifying, for each of the plurality of configuration parameters, a source of a parameter value;

obtaining, for each of the plurality of configuration parameters, a parameter value from its identified source;

building a configured application package, the configured application package comprising installation files corresponding to the requested application and configuration files comprising a parameter value for each of the plurality of configuration parameters needed for operation of the requested application; and returning the configured application package to the remote terminal.

11. The method of claim 10, wherein:

identifying, for the requested application, a plurality of configuration parameters needed for operation of the requested application on the remote terminal comprises looking up the plurality of configuration parameters in a database that associates, for each of a plurality of applications, identification of the plurality of configuration parameters needed for operation of the application on the remote terminal; and identifying, for each of the plurality of configuration parameters, a source of a parameter value comprises looking up a source of each parameter value in a database which associates, for each configuration parameter, identification of a source of the parameter value.

12. The method of claim 11, wherein:

identifying, for the requested application, a plurality of configuration parameters needed for operation of the requested application on the remote terminal comprises:

identifying at least two configuration parameters needed for operation of the requested application on the remote terminal;

identifying a first source associated with a first of the at least two configuration parameters;

identifying second source associated with a second of the at least two configuration parameters, the first source and the second source being independent sources; and obtaining, for each of the plurality of configuration parameters, a parameter value from its identified source comprises:

obtaining a first parameter value for the first configuration parameter from the first source; and obtaining a second parameter value for the second configuration parameter from the second source; and the configuration files include at least the first parameter value and the second parameter value.

13. The method of claim 12, wherein the configuration parameters include at least two of the following configuration parameters:

a service account parameter, the service account parameter being a configuration parameter unique to a service account associated with the remote terminal;

an application server parameter, the application server parameter being unique to an application server with which the application, when operated on the remote terminal, will interact and common to a plurality of remote terminals which interact with the application server; and a remote terminal compatibility parameter, the remote terminal compatibility parameter associating with a characteristic of the remote terminal which effects operation of the requested application.

14. The method of claim 13, wherein a specific version of installation files is selected from a plurality of versions of installation files corresponding to the requested application, the specific version of installation files being a version which corresponds to a compatibility parameter value associated with the remote terminal.

15. The method of claim 10, wherein:

the download request further includes identification of the remote terminal; and a specific version of installation files is selected from a plurality of versions of installation files corresponding to the requested application, the specific version of installation files being a version which corresponds to a compatibility parameter value associated with the remote terminal, the compatibly parameter value being derived form the identification of the remote terminal.

16. The method of claim 15, wherein:

identifying, for the requested application, a plurality of configuration parameters needed for operation of the requested application on the remote terminal comprises looking up the plurality of configuration parameters in a database that associates, for each of a plurality of applications, identification of the plurality of configuration parameters needed for operation of the application on the remote terminal; and identifying, for each of the plurality of configuration parameters, a source of a parameter value comprises looking up a source of each parameter value in a database which associates, for each configuration parameter, identification of a source of the parameter value.

17. The method of claim 16, wherein:

identifying, for the requested application, a plurality of configuration parameters needed for operation of the requested application on the remote terminal comprises:

identifying at least two configuration parameters needed for operation of the requested application on the remote terminal;

identifying a first source associated with a first of the at least two configuration parameters;

identifying second source associated with a second of the at least two configuration parameters, the first source and the second source being independent sources; and obtaining, for each of the plurality of configuration parameters, a parameter value from its identified source comprises:

obtaining a first parameter value for the first configuration parameter from the first source; and obtaining a second parameter value for the second configuration parameter from the second source; and the configuration files include at least the first parameter value and the second parameter value.

18. The method of claim 17, wherein the configuration parameters include at least two of the following configuration parameters:

a service account parameter, the service account parameter being a configuration parameter unique to a service account associated with the remote terminal;

an application server parameter, the application server parameter being unique to an application server with which the application, when operated on the remote terminal, will interact and common to a plurality of remote terminals which interact with the application server; and a remote terminal compatibility parameter, the remote terminal compatibility parameter associating with a characteristic of the remote terminal which effects operation of the requested application.

* * * * *